United States Patent [19]

Mitsuhashi

[11] Patent Number: 4,605,885
[45] Date of Patent: Aug. 12, 1986

[54] METHOD OF CONTROLLING ROTATION SPEED OF MOTOR

[75] Inventor: Masamichi Mitsuhashi, Hyogo, Japan

[73] Assignee: Mitsubishi Denki Kabushiki Kaisha, Tokyo, Japan

[21] Appl. No.: 751,548

[22] Filed: Jul. 3, 1985

[30] Foreign Application Priority Data

Aug. 7, 1984 [JP] Japan ................................ 59-166724

[51] Int. Cl.⁴ .............................................. H02P 5/00
[52] U.S. Cl. .................................... 318/317; 318/314; 318/341; 318/327
[58] Field of Search ............... 318/311, 312, 313, 314, 318/315, 316, 317, 318, 322, 326, 327, 328, 341, 345 R, 599, 600, 601, 602, 603, 604, 605, 606, 607, 608, 609, 615, 616, 617, 618, 628

[56] References Cited

U.S. PATENT DOCUMENTS

| | | | |
|---|---|---|---|
| Re. 29,275 | 6/1977 | Berman et al. ............. | 318/345 F X |
| 3,508,132 | 4/1970 | Peterson ..................... | 318/327 X |
| 3,551,775 | 12/1970 | Safiuddin ..................... | 318/434 |
| 3,629,633 | 12/1971 | O'Callaghan ................. | 318/317 X |
| 3,735,225 | 5/1973 | Raatz ........................... | 318/327 |
| 4,028,601 | 6/1977 | Peterson ...................... | 318/308 X |
| 4,155,033 | 5/1979 | DeBell et al. ................ | 318/341 |
| 4,203,061 | 5/1980 | Minakuchi .................... | 318/314 X |
| 4,205,260 | 5/1980 | Maeda et al. ................ | 318/327 |
| 4,254,368 | 3/1981 | Ido et al. ..................... | 318/341 X |
| 4,271,382 | 6/1981 | Maeda et al. ................ | 318/318 |
| 4,371,819 | 2/1983 | Kaufmann .................... | 318/341 |
| 4,471,281 | 9/1984 | Uezumi et al. ............... | 318/318 X |

Primary Examiner—William M. Shoop, Jr.
Assistant Examiner—Shik Luen Paul Ip
Attorney, Agent, or Firm—Bernard, Rothwell & Brown

[57] ABSTRACT

A method of controlling the rotation speed of a motor to maintain it at a desired value, comprising a step of obtaining a deviation between the detected rotation speed and the desired value, and a step of changing the gain of a feedback loop, which serves to control the current flowing in the motor, to a value lower than a predetermined one during a period in which the deviation of the detected deviation in rotation speed is smaller than a preset maximum ripple value.

2 Claims, 4 Drawing Figures

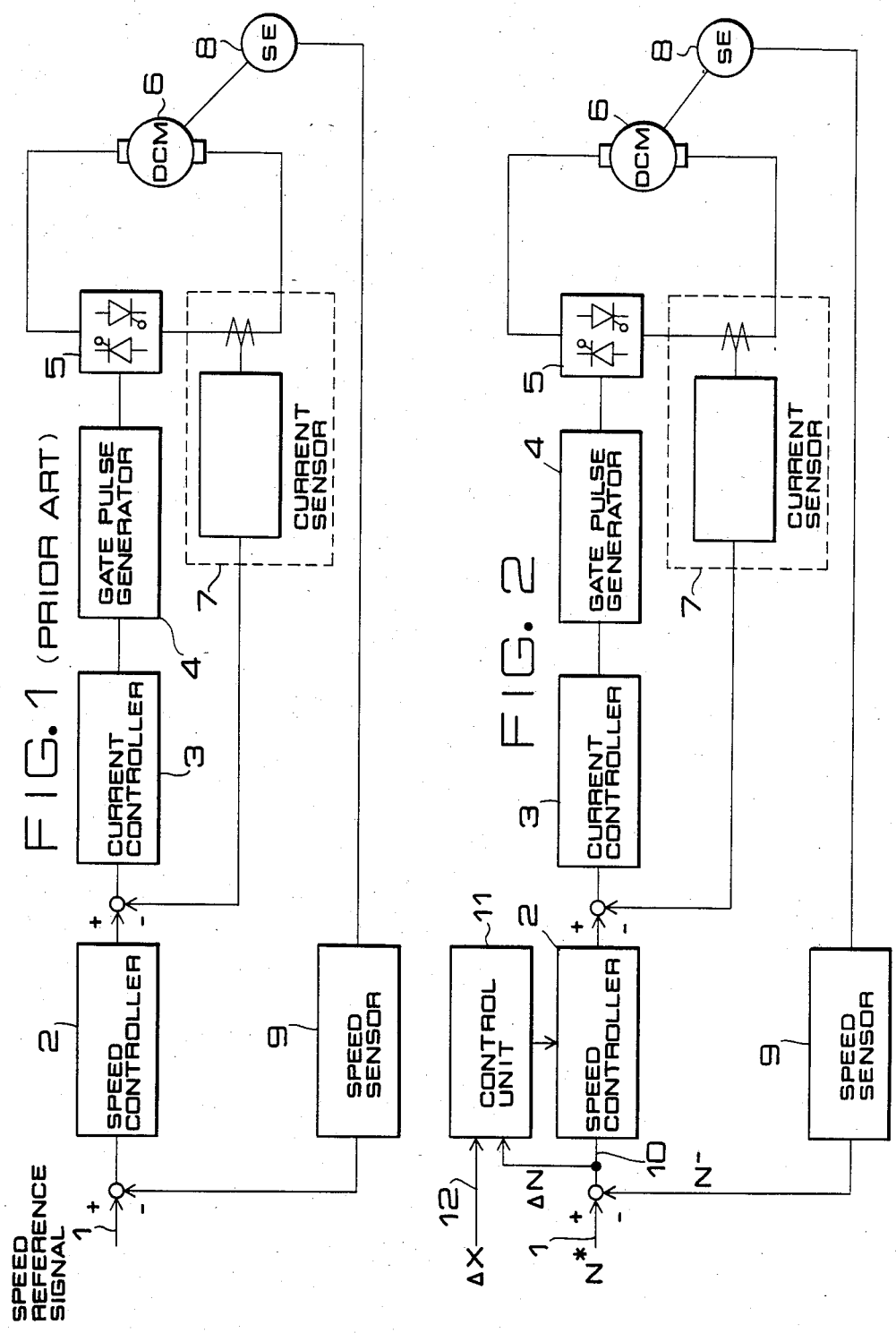

METHOD OF CONTROLLING ROTATION SPEED OF MOTOR

BACKGROUND OF THE INVENTION

1. Field of the Invention

The present invention relates to a method of controlling the rotation speed of a motor to obtain a desired value and, more particularly, to an improved method capable of maintaining the rotational speed at a desired value without being affected by any ripple component contained in a speed detection signal outputted from a shaft encoder.

2. Description of the Prior Art

FIG. 1 is a block diagram of a conventional apparatus for digital speed control of a DC motor disclosed in the "DC Motor Control and Sensor" made public in the 1983 Joint Meeting of Four Electric Societies. In this diagram, there are shown a digital speed reference signal 1, a speed controller 2 having a proportional-plus-integral function, a current controller 3 having also a proportional-plus-integral function, a gate pulse generator 4, a main circuit 5 of a thyristor converter, a DC motor 6, a current sensor 7 for detecting a main circuit current and outputting it in the form of a digital value, a shaft encoder 8 connected to one end of a shaft of the DC motor, and a speed sensor 9 for digitizing the detected speed value obtained from the shaft encoder. In this example, each of the speed controller 2 and the current controller 3 is supposed to have a computing function with a microprocessor employed therein.

Referring to the operation performed in the above exemplary apparatus, its control system comprises a speed feedback control circuit having a current minor loop, in which a deviation between the speed reference signal 1 and the speed feedback value obtained from the speed sensor 9 is inputted to the speed controller 2 having a proportional-plus-integral function, where the speed value is computed. The output of the speed controller 2 serves as a current reference signal, and a deviation between this reference signal and the current feedback signal detected by the current sensor 7 is inputted to the current controller 3. The output of the current controller 3 serves as a phase reference signal for the gate pulse generator 4 and, in response to occurrence of any speed variation, a steady state is achieved when a coincidence is attained between the speed detection value and the speed reference signal.

Describing now the method for such speed detection, the output of the shaft encoder 8 contains some ripple (detection error) resulting from the mechanical precision, condition of installation and so forth of the shaft encoder. Although the ripple component is normally ±0.1% or so, it is amplified, when the encoder output is fed to the speed controller, at a proportional gain and is thereby increased to a current ripple on the order of 1 to 10%, which then brings about limitation relative to setting of the gain in the speed control system. In order to minimize the speed detection error, several methods are adopted today including one that averages the detection value by taking a longer speed sampling time, and one that obtains an average value by the use of known detection data acquired empirically in the past. However, a disadvantage is unavoidable due to a prolonged idle time in the control system so that a fast control response cannot be obtained.

The general speed detection method in the prior art is described in the cited reference.

SUMMARY OF THE INVENTION

An object of the present invention is to provide an improved motor speed control method which is capable of eliminating the disadvantages observed in the conventional control method mentioned above.

Summarizing the invention, when feedback control is executed for the rotation speed of a motor in accordance with the value detected by a speed sensor, the method is so carried out that in case a deviation of the detected rotation speed from a desired set value is smaller than a predetermined maximum ripple value, the proportional gain of the speed controller to establish the motor speed is reduced to a value lower than a fixed level, thereby stabilizing the operation of the control system. And in case the above deviation is in excess of the maximum ripple value, the proportional gain of the speed controller is returned to the fixed level so that a fast response is retained for the rotation speed control in such state.

BRIEF DESCRIPTION OF THE DRAWINGS

FIG. 1 is a block diagram representing a conventional method for speed control of a motor;

FIG. 2 is a block diagram representing an exemplary method for speed control of a motor according to the present invention;

DETAILED DESCRIPTION OF THE PREFERRED EMBODIMENT

Figure 3:
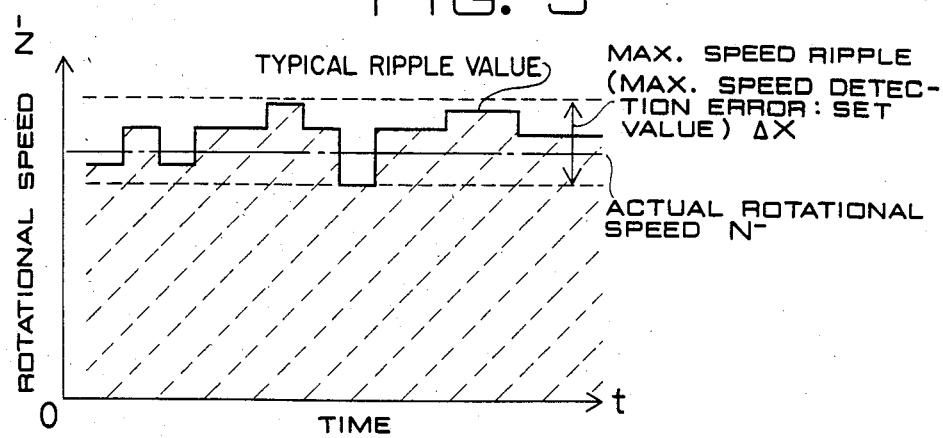
FIG. 3 graphically shows the relationship between a typical ripple value in a detected rotational speed signal and a maximum ripple value.

Hereinafter an exemplary embodiment of the present invention will be described with reference to the accompanying drawings. In FIG. 2, there are shown a digital speed reference signal 1, and a speed controller 2 having a proportional-plus-integral function and so formed as to be smoothly changeable with respect to its proportional gain and integral time constant in response to a command from a control unit 11 which compares a speed detection error 12 with a deviation signal 10 obtained out of the detected speed value and the speed reference signal and feeds to the speed controller 2 a command to change the control constant. Further shown are a current controller 3 having a proportional-plus-integral function, a gate pulse generator 4, a main circuit 5 of a thyristor converter, a DC motor 6, a current sensor 7 for detecting a main circuit current and converting it to a digital value, a shaft encoder 8 connected to one end of a shaft of the DC motor, and a speed sensor 9 for digitizing the detected speed value.

It is preferred that the computation in each of the speed controller 2, current controller 3 and control unit 11 be executed by an unshown microprocessor.

Figure 4:
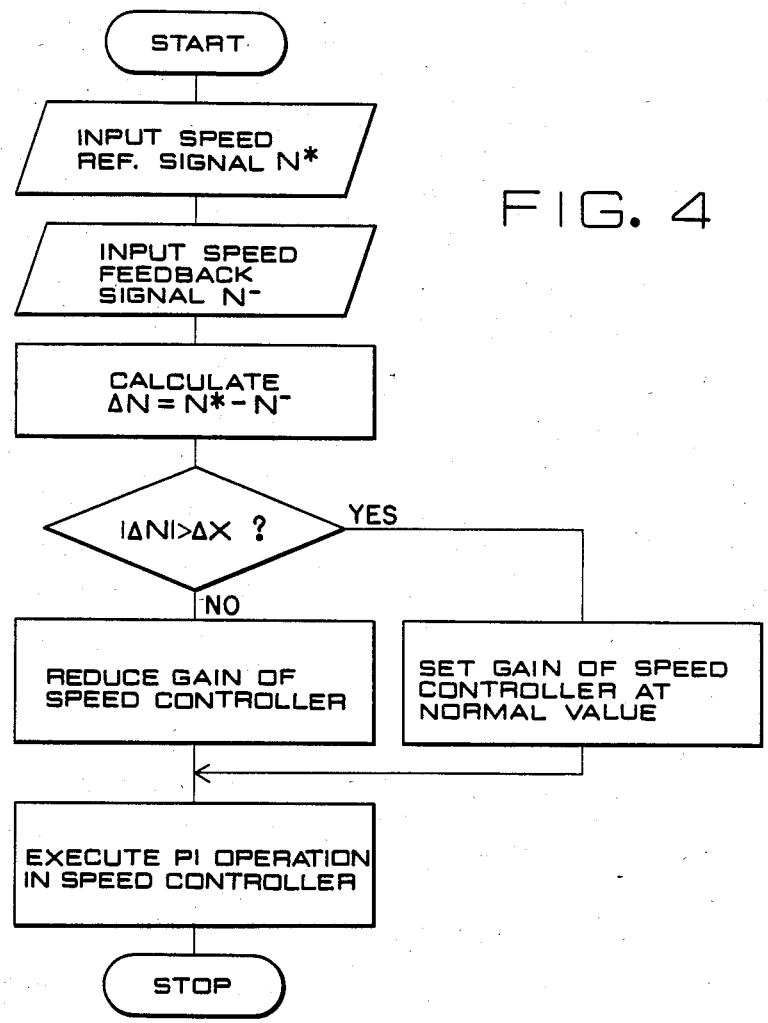
FIG. 4 is a flowchart of steps for executing the method of FIG. 2.

As regards the operation performed in the above arrangement, the action of the entire speed control system is equal to the one described already in connection with the prior art and therefore a repeated explanation is omitted here. Now a description will be given below on the actions of the speed controller 2 and the control unit 11, which are essentials of the invention, with reference to the timing chart of FIG. 3 and the flowchart of FIG. 4.

As mentioned previously, the detected speed value contains a ripple component (speed detection error). When the input to the speed controller has a value within the speed detection error, it is difficult to discriminate whether the input is a proper signal or an error signal. In such a case, therefore, the speed control system is considered satisfactory when being in a steadily stable state if it does not indicate a desired high control precision. The control unit 11 shown in FIG. 2 compares the input signal 10 (deviation $\Delta N$ of the detected speed value from the speed reference signal) of the speed controller with a predetermined maximum speed ripple or maximum speed detection error $\Delta X$ 12 and, in case the former is smaller than the latter, reduces the control constant or gain of the speed controller 2 for suppressing the ripple, which is superposed on the current reference signal, to a value permissible relative to the current ripple.

When the deviation $\Delta N$ is in excess of the maximum detection error $\Delta X$, the control unit 11 returns the control constant of the speed controller 2 to the former value to realize a required transient response.

In the digital control system employing a microprocessor, numerical calculation is rendered easy with respect to the proportional gain, integral time constant and integral term in the proportional-plus-integral control, so that the present invention can be carried out with facility.

Although the foregoing description has been given in connection with an exemplary embodiment using a microprocessor, equivalent functions may be performed by the employment of concrete circuits (hardware), and the aforesaid digital processing mode may be replaced with an analog mode.

It is to be understood that, besides the above embodiment where a shaft encoder is employed as speed sensing means, the present invention is applicable to another case as well where a ripple component (detection error) is derived from some other speed sensing means.

Furthermore, the present invention is applicable also to variable speed control for an AC motor in addition to the aforesaid control for a DC motor.

According to the invention, as described hereinabove, an input signal to the speed controller in a speed control system is discriminated and, in case the signal value is within a predetermined range of speed detection error, the control constant of the speed controller is reduced for suppressing the current ripple, which results from the speed ripple, to a permissible value to stabilize the control system in a steady state. And in case the input signal to the speed controller has any value in excess of such predetermined range, a required transient response can be realized.

What is claimed is:

1. A method of controlling the rotation speed of a motor comprising the steps of:

detecting a deviation between the rotation speed detected by a speed sensor and a desired rotation speed;

detecting a difference between a detected current flowing in said motor and a current reference signal obtained through a computation executed in a speed controller on the basis of said deviation, and subsequently;

controlling the motor current in accordance with a signal obtained through a computation executed in a current controller on the basis of said difference, thereby maintaining the rotation speed of said motor at a desired value;

comparing a maximum ripple value with said deviation;

setting the gain of said speed controller at a predetermined first value, in response to the comparing step indicating said deviation is greater than said maximum ripple value, to provide for fast response in controlling the motor rotation speed; and setting the gain of said speed controller at a second value which is lower than said predetermined first value, in response to the comparing step indicating that said deviation is smaller than said maximum ripple value, to stabilize speed control by avoiding fast adjustments in speed due to ripple.

2. The method as defined in claim 1, wherein said speed controller has a proportional-plus-integral function and, during a period in which said deviation is smaller than said maximum ripple value, the proportional gain of said funtion is held at a lower value.

* * * * *